US011940202B2

(12) United States Patent
Arens et al.

(10) Patent No.: US 11,940,202 B2
(45) Date of Patent: Mar. 26, 2024

(54) APPLIANCES WITH RELEASABLE DOOR HINGES AND TETHER SYSTEMS

(71) Applicant: Haier US Appliance Solutions, Inc., Wilmington, DE (US)

(72) Inventors: Elaine Marie Arens, Louisville, KY (US); Ronald Fernandez, Louisville, KY (US); Bart Andrew Nuss, Fisherville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 100 days.

(21) Appl. No.: 17/592,618

(22) Filed: Feb. 4, 2022

(65) Prior Publication Data

US 2023/0251018 A1 Aug. 10, 2023

(51) Int. Cl.

*F25D 23/02* (2006.01)
*E05D 7/12* (2006.01)
*E05D 11/06* (2006.01)

(52) U.S. Cl.

CPC ........... *F25D 23/028* (2013.01); *E05D 7/123* (2013.01); *E05D 11/06* (2013.01); *E05Y 2900/306* (2013.01); *F25D 2323/024* (2013.01)

(58) Field of Classification Search

CPC .. E05D 3/12; E05D 7/10; E05D 7/123; E05D 7/1061; E05D 3/18; E05D 5/10; E05D 15/507; E05D 7/1005; E05D 11/06; E05Y 2900/306; E05Y 2900/31; F25D 2400/10; F25D 2331/804; F25D 2323/024; F25D 23/028

See application file for complete search history.

(56) References Cited

U.S. PATENT DOCUMENTS 2,041,850 A * 5/1936 Melick ...................... E05D 7/00 16/262
2,893,772 A 7/1959 Edwards
3,001,225 A * 9/1961 Squire .................. E05F 1/1276 16/358
3,467,938 A * 9/1969 Jahr ..................... F25D 23/028 439/31

(Continued)

FOREIGN PATENT DOCUMENTS

CN 206973992 U 2/2018
DE 202019002308 U1 6/2019

(Continued)

*Primary Examiner* — Hiwot E Tefera
(74) *Attorney, Agent, or Firm* — Dority & Manning, P.A.

(57) ABSTRACT

An appliance includes a cabinet, defining a food storage chamber, and a door. The appliance includes a hinge system coupling the door to the cabinet. The hinge system includes a first hinge arm fixed to the door, a second hinge arm pivotably joined with the first hinge arm, a carrier fixed to the cabinet, the second hinge arm releasably received in the carrier, and a tether cable extending between a first end and a second end. The first end of the tether cable fixed to the second hinge arm, the second end of the tether cable removably attached to a surface inside the food storage chamber. The tether cable configured such that the door may be detachable from the cabinet when the second end of the tether cable becomes detached from the surface inside the food storage chamber.

20 Claims, 8 Drawing Sheets

(56) References Cited

U.S. PATENT DOCUMENTS

| | | | | |
|---|---|---|---|---|
| 3,690,708 | A * | 9/1972 | Worley | E05C 19/06 292/101 |
| 4,807,331 | A * | 2/1989 | Calucci | E05D 7/1005 16/382 |
| 6,378,173 | B1 * | 4/2002 | Ho | E05D 3/12 16/373 |
| 9,918,547 | B2 | 3/2018 | Wilmes et al. | |
| 2002/0124738 | A1 * | 9/2002 | Lee | E05F 1/1261 99/473 |
| 2006/0113457 | A1 * | 6/2006 | Zhang | G03G 21/1666 248/637 |
| 2007/0089269 | A1 * | 4/2007 | Shen | E05D 7/123 16/268 |
| 2010/0088961 | A1 * | 4/2010 | Roten | E05D 7/1005 49/506 |
| 2015/0167367 | A1 * | 6/2015 | Sawaguchi | E05D 3/18 16/231 |
| 2019/0277552 | A1 | 9/2019 | Vu | |
| 2021/0025207 | A1 | 1/2021 | Nuss | |

FOREIGN PATENT DOCUMENTS

| | | | | |
|---|---|---|---|---|
| EP | 2664738 | A2 * | 11/2013 | E05F 1/1261 |
| GB | 2167804 | A * | 6/1986 | E05F 1/1284 |
| JP | 2020186609 | A | 11/2020 | |

* cited by examiner

APPLIANCES WITH RELEASABLE DOOR HINGES AND TETHER SYSTEMS

FIELD OF THE INVENTION

The present subject matter relates generally to appliances having a cabinet and a door, such as freezer appliances.

BACKGROUND OF THE INVENTION

Freezer appliances generally include a cabinet that defines one or more chilled chambers for receipt of food items for storage. One or more insulated, sealing doors are provided for selectively enclosing the chilled food storage chamber(s). Generally, the door(s) are movable between a closed position and an open position for accessing food items stored therein by pulling on the door(s), such as by pulling on a handle on the door. The freezer door is generally rotatably mounted to the cabinet using one or more hinges, which are typically fixed to the cabinet and the door. In some instances, such doors may be cumbersome or inconvenient to operate. For example, the door may be inconvenient to open if the handle breaks.

A lock on the freezer door may secure the door in closed position and thereby prevent unauthorized access to the interior of the cabinet. The Refrigeration Safety Act of 1956 requires household refrigerators to have a device that allows the household refrigerator door to be opened easily from the inside.

BRIEF DESCRIPTION OF THE INVENTION

Aspects and advantages of the invention will be set forth in part in the following description, or may be apparent from the description, or may be learned through practice of the invention.

In one example embodiment, an appliance defining a vertical direction, a lateral direction, and a transverse direction, the vertical, lateral, and transverse directions being mutually perpendicular. The appliance includes a cabinet defining a food storage chamber. The food storage chamber includes a top portion and a back portion. The top portion of the food storage chamber defining an opening for receipt of food items. The appliance also includes a door positioned at the top portion of the food storage chamber, movable between a closed position and an open position to selectively enclose the food storage chamber in the closed position and provide access to the food storage chamber in the open position. Further, the appliance includes a hinge system rotatably coupling the door to the cabinet. The hinge system includes a first hinge arm fixed to one of the door and the cabinet, a second hinge arm pivotably joined with the first hinge arm, a carrier fixed to the other of the door and the cabinet, the second hinge arm releasably received in the carrier, and a tether cable extending between a first end and a second end. The first end of the tether cable fixed to the second hinge arm, the second end of the tether cable removably attached to a surface inside the food storage chamber. The tether cable configured such that the door may be detachable from the cabinet when the second end of the tether cable becomes detached from the surface inside the food storage chamber.

In another example embodiment, a hinge for an appliance, where the appliance defines a vertical direction, a lateral direction, and a transverse direction, the vertical, lateral, and transverse directions being mutually perpendicular. The appliance includes a cabinet and a door, where the hinge rotatably couples the door to the cabinet. The hinge includes a first hinge arm fixed to one of the door and the cabinet, a second hinge arm pivotably joined with the first hinge arm, and a carrier fixed to the other of the door and the cabinet. The second hinge arm may be releasably received by the carrier. The hinge also includes a tether cable extending between a first end and a second end. The first end of the tether cable fixed to the second hinge arm, and the second end of the tether cable removably attached to a surface inside the food storage chamber. The tether cable configured such that the door may be detachable from the cabinet when the second end of the tether cable becomes detached from the surface inside the food storage chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
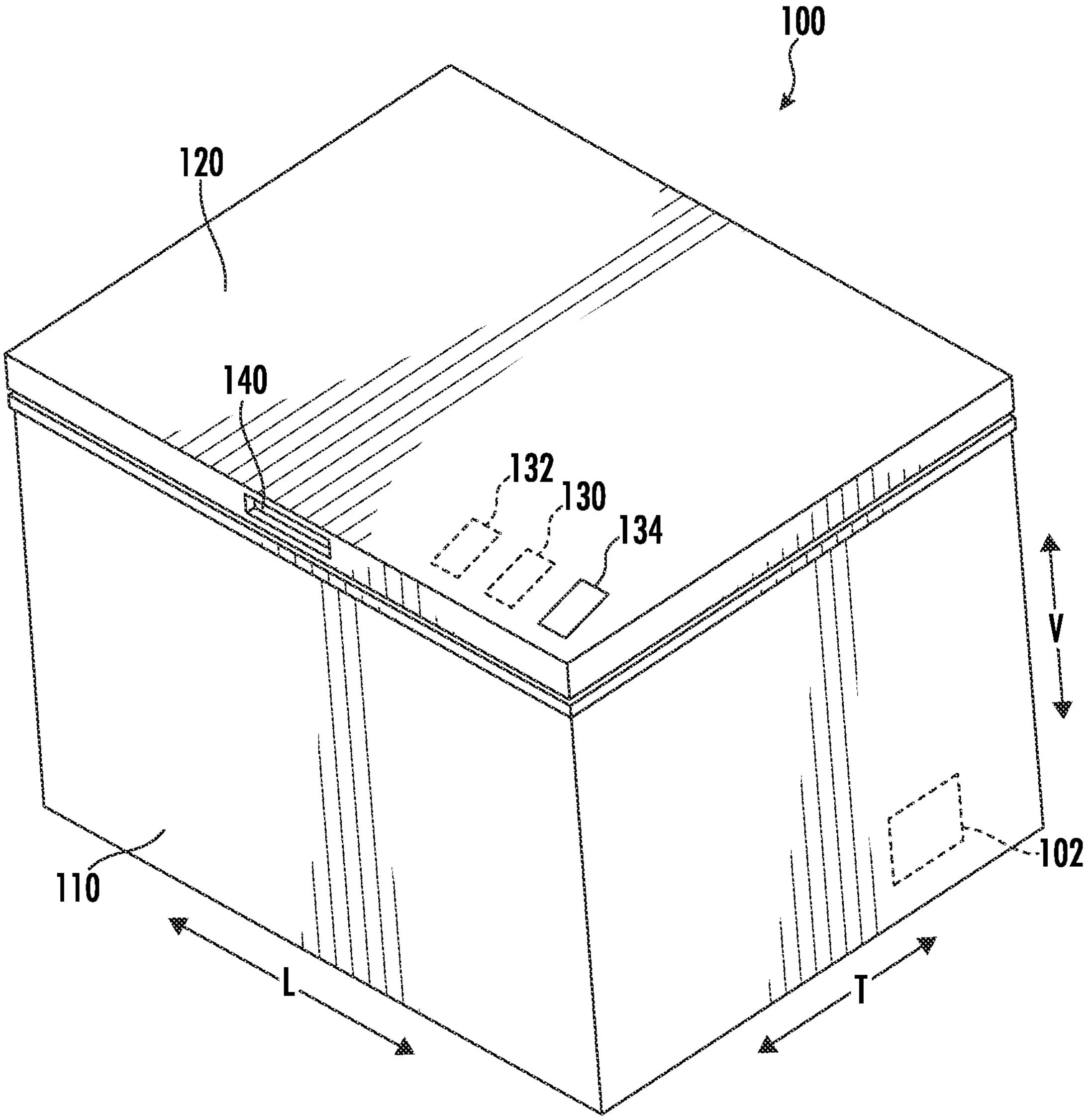
FIG. 1 illustrates a front perspective view of a freezer appliance according to an example embodiment of the present subject matter with a door of the appliance shown in the closed position.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment maybe used with another embodiment to yield a still further embodiment. Thus, it is intended that the present invention covers such modifications and variations as come within the scope of the appended claims and their equivalents.

As used herein, the terms “first,” “second,” and “third” may be used interchangeably to distinguish one component from another and are not intended to signify location or importance of the individual components. The terms “upstream” and “downstream” refer to the relative flow direction with respect to fluid flow in a fluid pathway. For example, “upstream” refers to the flow direction from which the fluid flows, and “downstream” refers to the flow direction to which the fluid flows. The terms “includes” and “including” are intended to be inclusive in a manner similar to the term “comprising.” Similarly, the term “or” is generally intended to be inclusive (i.e., “A or B” is intended to mean “A or B or both”).

Approximating language, as used herein throughout the specification and claims, is applied to modify any quantitative representation that could permissibly vary without resulting in a change in the basic function to which it is related. Accordingly, a value modified by a term or terms, such as “about,” “approximately,” and “substantially,” are not to be limited to the precise value specified. In at least some instances, the approximating language may correspond to the precision of an instrument for measuring the value. For example, the approximating language may refer to being within a ten percent (10%) margin.

Figure 2:
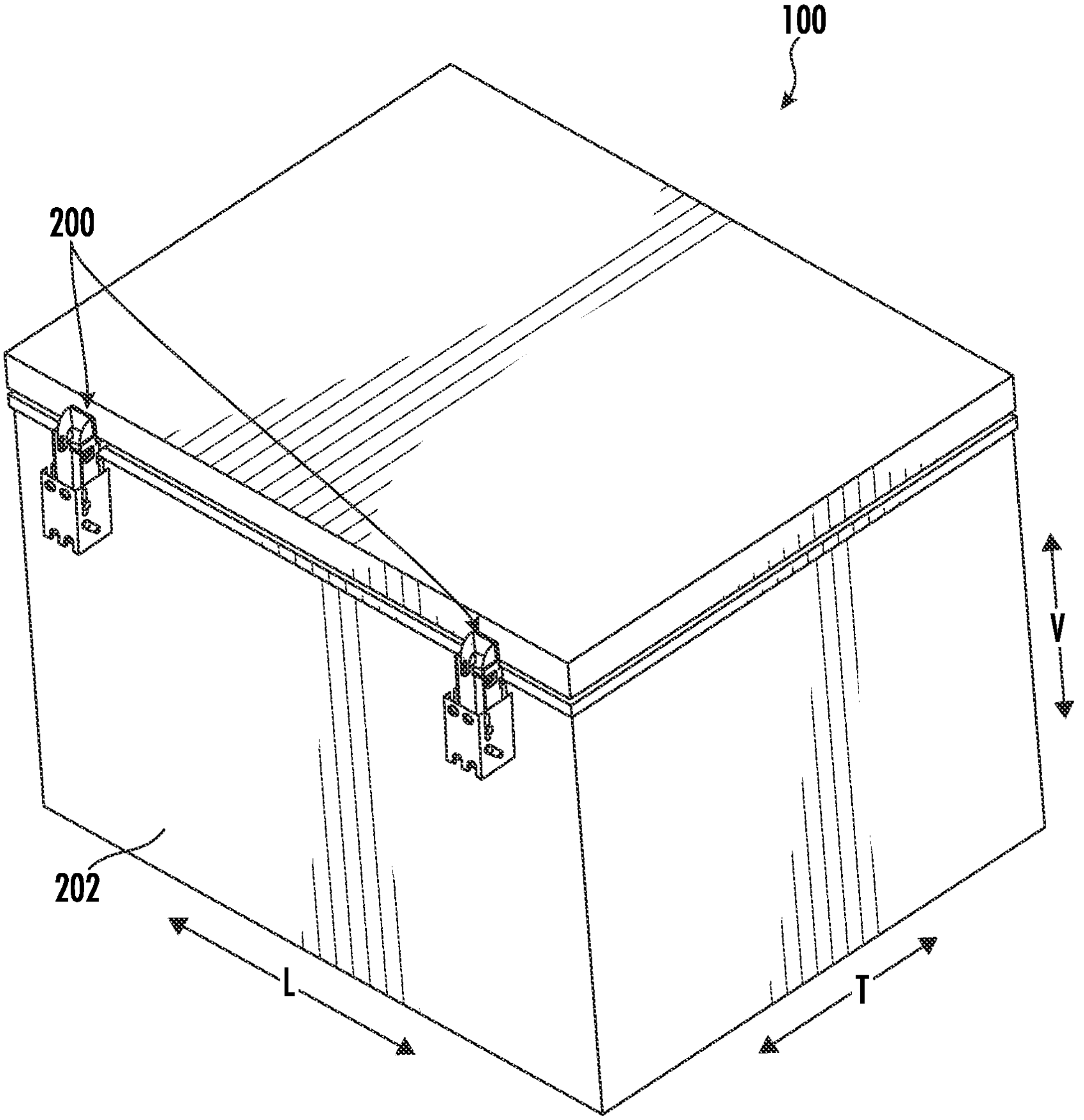
FIG. 2 illustrates a rear perspective view of the example freezer appliance of FIG. 1 with the door of the appliance shown in the closed position.
Figure 3:
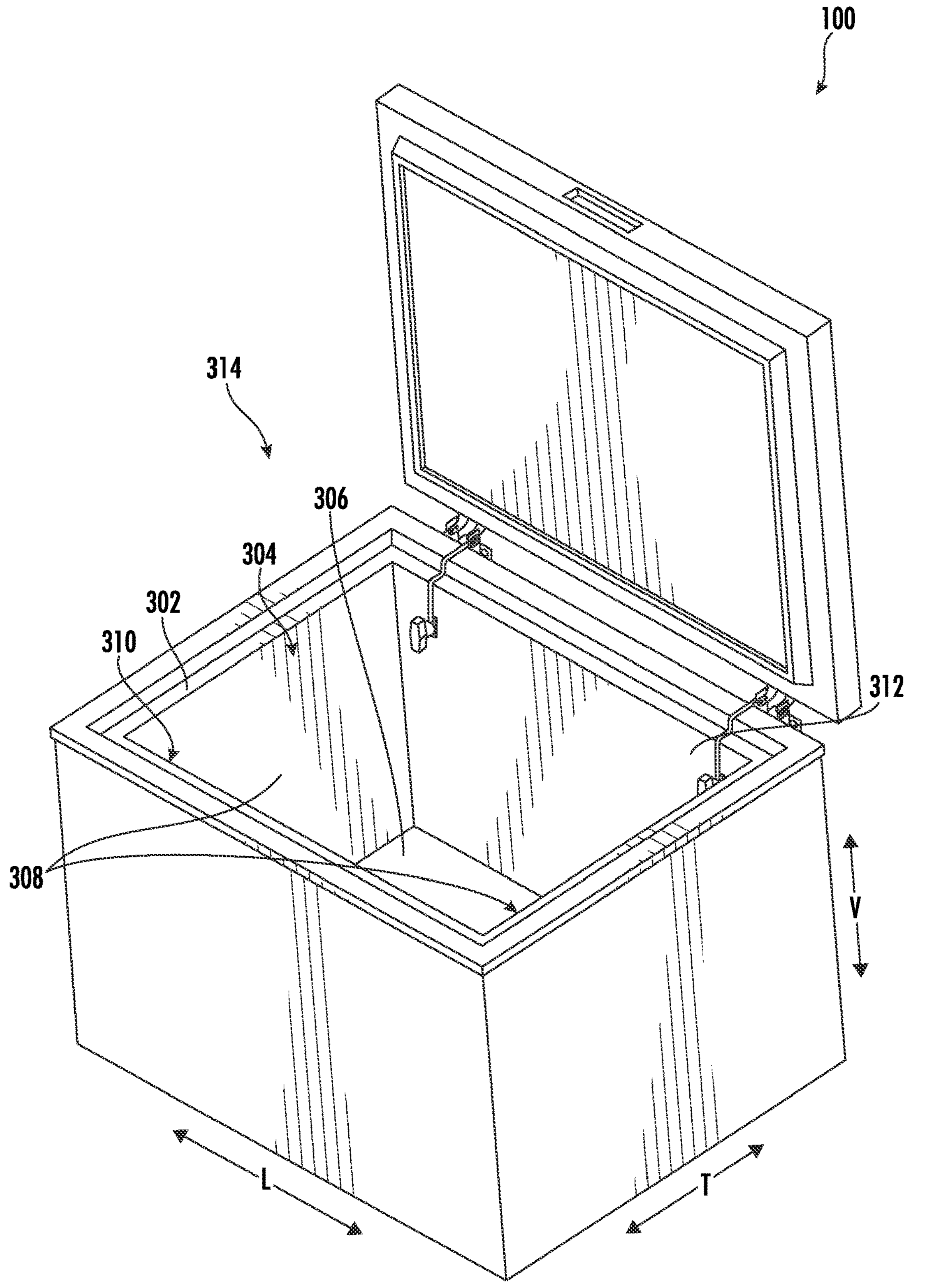
FIG. 3 illustrates a front perspective view of the example freezer appliance of FIG. 1 with the door of the appliance shown in the open position.

With reference to FIGS. 1-3, an appliance 100 according to an example embodiment of the present subject matter is shown. Appliance 100 may be configured for receipt of food articles for storage. For instance, appliance 100 may be positioned at an exterior location, and a deliverer may place groceries, meal(s), etc. within appliance 100 for storage. A user may then retrieve the items from within appliance 100 at a later time, e.g., when the user arrives home. Appliance 100 may define a vertical direction V, a lateral direction L, and a transverse direction T. The vertical direction V, lateral direction L, and transverse direction T may be mutually perpendicular and form an orthogonal direction system. Additionally, in FIG. 1, a front portion 110 and a door 120 of appliance 100 are shown, and FIG. 2 shows a back portion 202, as well as a hinge system 200. FIG. 3 illustrates a perspective view of appliance 100 in an open configuration.

Appliance 100 may include a cabinet 302. Cabinet 302 may define an interior chamber 304 for storage of items within cabinet 302. Cabinet 302 may be generally configured for containing and/or supporting various components of appliance 100 and which may also define one or more internal chambers or compartments of appliance 100. In this regard, as used herein, the terms “cabinet,” “housing,” and the like are generally intended to refer to an outer frame or support structure for appliance 100, e.g., including any suitable number, type, and configuration of support structures formed from any suitable materials, such as a system of elongated support members, a plurality of interconnected panels, or some combination thereof. It should be appreciated that cabinet 302 does not necessarily require an enclosure and may simply include open structure supporting various elements of appliance 100. By contrast, cabinet 302 may enclose some or all portions of an interior of cabinet 302. It should be appreciated that cabinet 302 may have any suitable size, shape, and configuration while remaining within the scope of the present subject matter.

Cabinet 302 may include insulated walls. For instance, cabinet 302 may include a bottom wall 306, sidewalls 308, a front wall 310, and a rear wall 312. Sidewalls 308, front wall 310, and rear wall 312 may extend upwardly from bottom wall 306, e.g., along the vertical direction V. Sidewalls 308 may be spaced apart, e.g., along the lateral direction L. Similarly, front wall 310 and rear wall 312 may be spaced apart, e.g., along the transverse direction T. As such, appliance 100 may generally be referred to as a chest-freezer style appliance. It may be recognized, however, that the benefits of the present disclosure apply to other types and styles of appliances such as, e.g., bottom mount refrigerator appliances, top mount refrigerator appliances, side-by-side style refrigerator appliances, single door refrigerator appliances, etc. Moreover, aspects of the present subject matter may be applied to other appliances as well. Consequently, the description set forth herein is for illustrative purposes only and is not intended to be limiting in any aspect to any particular appliance or configuration.

Door 120 may be mounted to cabinet 302. For example, door 120 may be rotatably mounted to cabinet 302 with hinge system 200. Door 120 may be positioned at a top portion of cabinet 302, e.g., and may form a top wall of cabinet 302 when door 120 is closed and positioned against cabinet 302. Thus, door 120 may be configured to permit selective access to interior chamber 304 and facilitate climate control for interior chamber 304. For example, cabinet 302 may define an opening 314 at top portion of cabinet 302 through which interior chamber 304 is accessible. When door 120 is open, door 120 may be positioned such that a user may access interior chamber 304 through opening 314. In particular, door 120 may be rotated away from opening 314 when door 120 is open. Conversely, door 120 may be positioned such that the user cannot access interior chamber 304 through opening 314 when door 120 is closed. In particular, door 120 may be rotated over opening 314 when door 120 is closed. As may be seen in FIG. 1, appliance 100 also includes a front lock 140, which may be configured for selectively securing door 120 in the closed arrangement. Front lock 140 may secure the contents of cabinet 302 from theft or otherwise unwanted access.

Operation of the appliance 100 may be regulated by controller 130 that may operatively be coupled to components of appliance 100, including sealed refrigeration system 102. Controller 130 may be positioned in a variety of locations throughout appliance 100. Input/output (“I/O”) signals may be routed between controller 130 and various operational components of appliance 100. The components of appliance 100 may be in communication with controller 130 via one or more signal lines or shared communication busses.

Controller 130 may be any device that includes one or more processors and a memory. As an example, in some embodiments of an example controller 130 may be a single board computer (SBC). For example, controller 130 may be a single System-On-Chip (SOC). However, any form of controller 130 may also be used to perform the present subject matter. The processor(s) may be any suitable processing device, such as a microprocessor, microcontroller, integrated circuit, or other suitable processing devices or combinations thereof. The memory may include any suitable storage media, including, but not limited to, non-transitory computer-readable media, RAM, ROM, hard drives, flash drives, accessible databases, or other memory devices. The memory may store information accessible by processor(s), including instructions that may be executed by processor(s) to perform aspects of the present disclosure.

A network interface 132 may couple appliance 100, e.g., controller 130, to a network such that appliance 100 may transmit and receive information over the network. The network may be any wired or wireless network such as a WAN, LAN, and/or HAN. Network interface 132 may include any circuitry or components for communication over the network. For example, controller 130 may use network interface 132 to communicate with a remote user interface. Network interface 132 may include transmitters, receivers, ports, controllers, antennas, or other suitable components for interfacing with the network.

Appliance 100, e.g., controller 130, may be in communication with a remote user interface via the network. The remote user interface may be any device configured to communicate over the network and allow a user to remotely generate and transmit command signals to controller 130. For example, the remote user interface may be a computer, a smartphone, a tablet, etc. The remote user interface may be in communication with controller 130 such that the remote user interface and controller 130 may transmit signals and data therebetween.

A control panel 134 may be provided for controlling the mode of operation. For example, control panel 134 includes one or more selector inputs, such as knobs, buttons, touch-screen interfaces, etc. In this regard, the inputs on control panel 134 may be in communication with controller 130. Signals generated in controller 130 may operate appliance 100 in response to selector inputs at control panel 134.

As shown schematically in FIG. 1, appliance 100 may include a sealed refrigeration system 102. Thus, cabinet 302 may contain components for executing a known vapor compression cycle for cooling air within interior chamber 304. The components may include a compressor, a condenser, an expansion device, and an evaporator connected in series and charged with a refrigerant. As will be understood by those skilled in the art, refrigeration system 102 may include additional components, e.g., at least one additional evaporator, compressor, expansion device, and/or condenser. In addition, refrigeration system 102 may be operable as a heat pump to heat air within interior chamber 304. The components and operation of sealed systems is well understood by those of ordinary skill in the art and is not described in detail herein for the sake of brevity.

Figure 4:
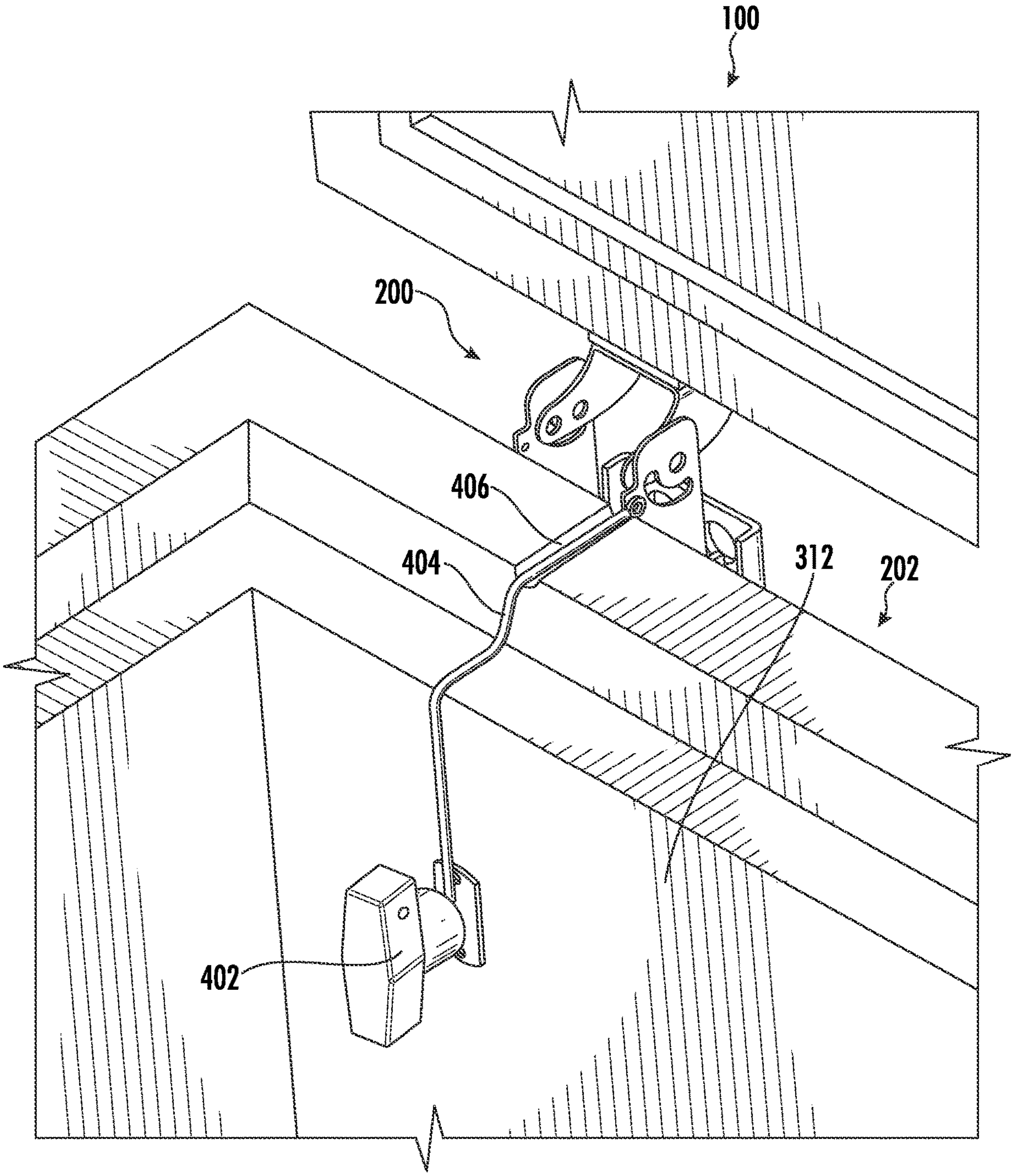
FIG. 4 illustrates a perspective view of a hinge system of the example freezer appliance illustrated in FIG. 3.

As may be seen through FIG. 4, hinge system 200 may rotatably couple door 120 at back portion 202 of cabinet 302. Pin 402 may couple tether cable 404 to the surface of rear wall 312. Tether cable 404 may run through channel 406 as to not deform a seal or prevent appliance 100 from sealing properly. As shown, pin 402 may be a T-shaped handle, however one skilled in the art would appreciate the handle may be of a variety of shapes. As may be seen in FIGS. 3 and 4, the example embodiment may include two tether cable 404 and pins 402, one for each hinge of hinge system 200. Alternatively, both hinges could be tethered to one quick-connect pin (not shown).

Figure 5:
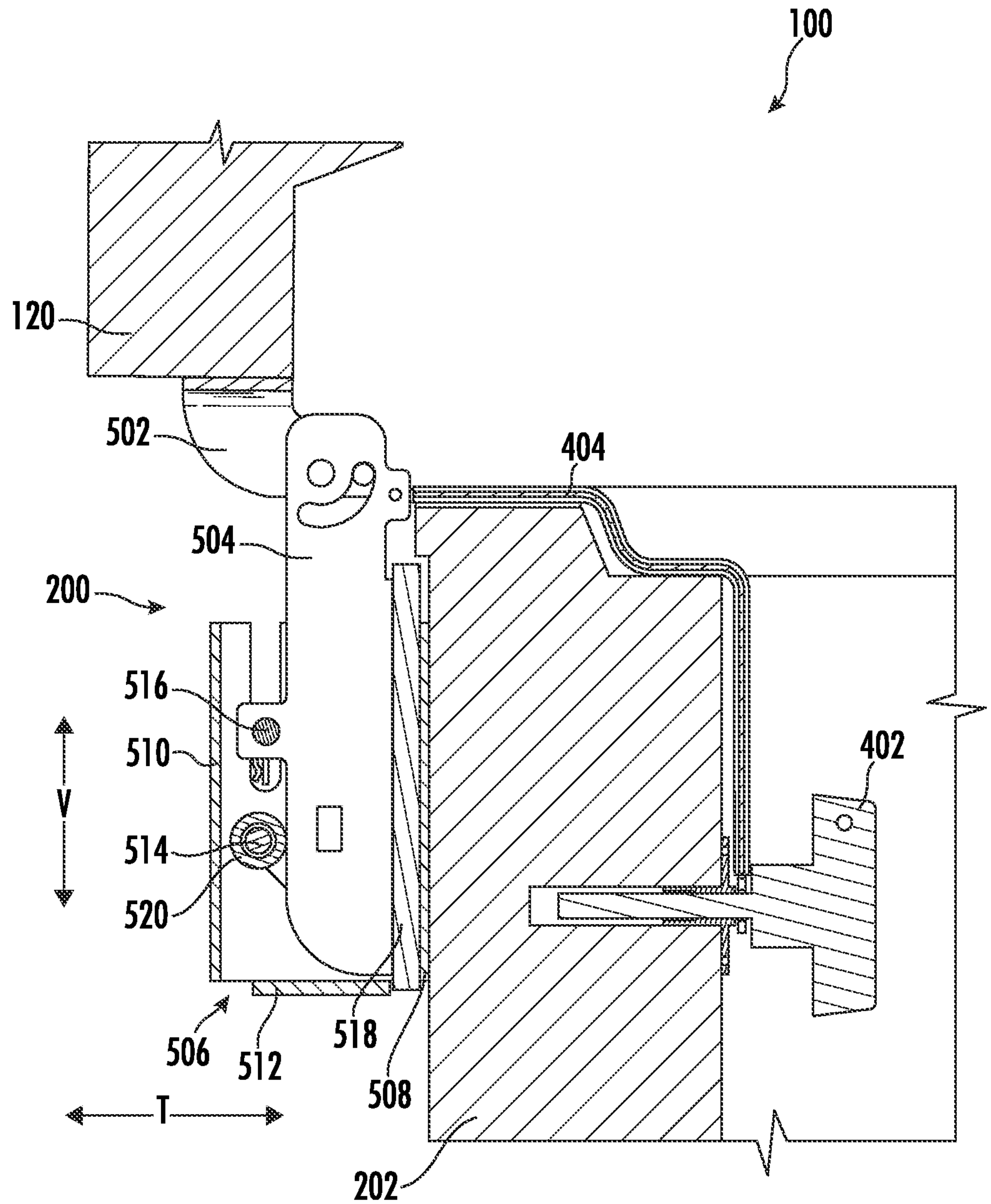
FIG. 5 illustrates a side section view of the hinge system of the example freezer appliance of FIG. 1 with hinges thereof in an open position.
Figure 6:
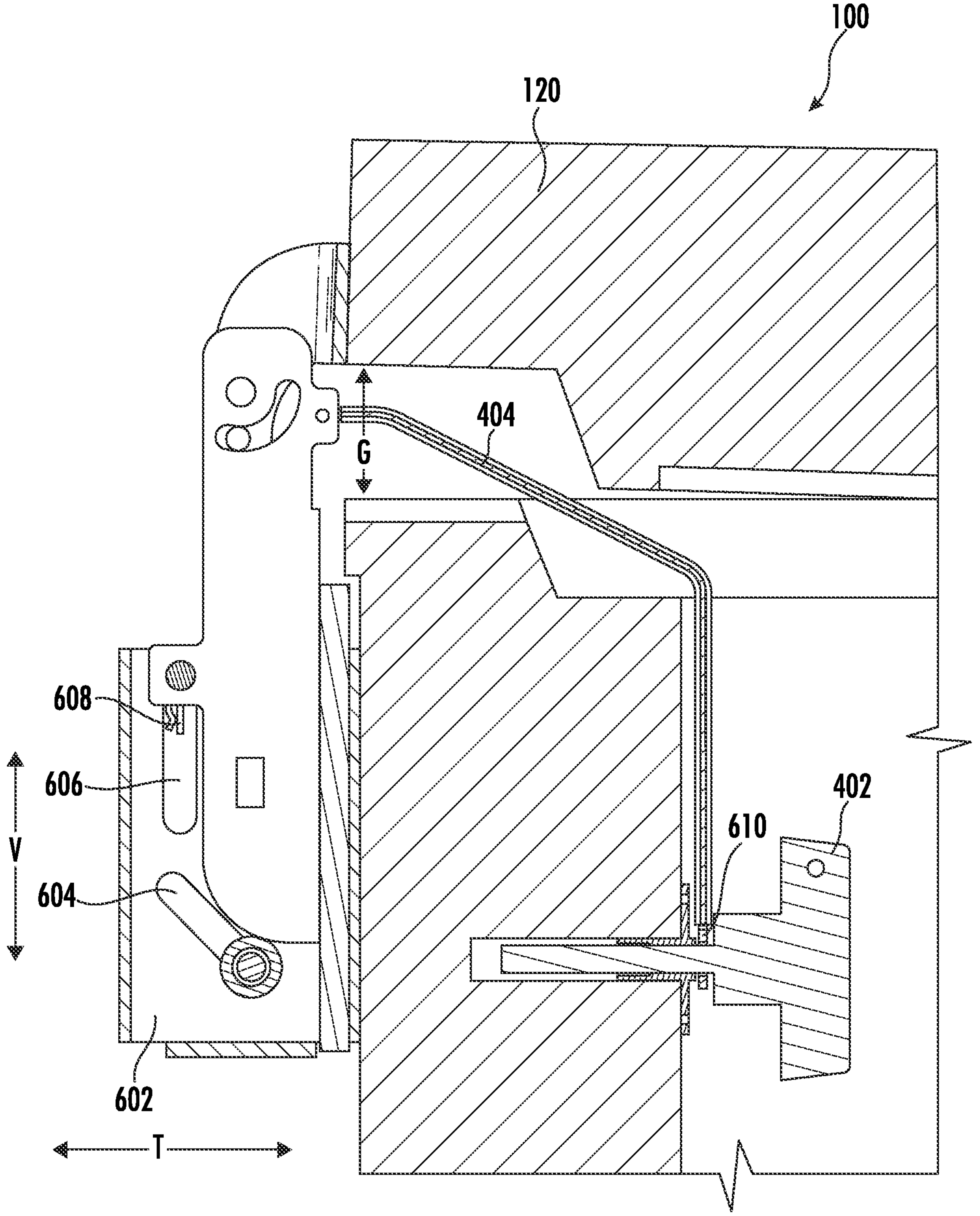
FIG. 6 illustrates a side section view of the hinge system of the example freezer appliance of FIG. 1 with the hinges in a first released position.
Figure 7:
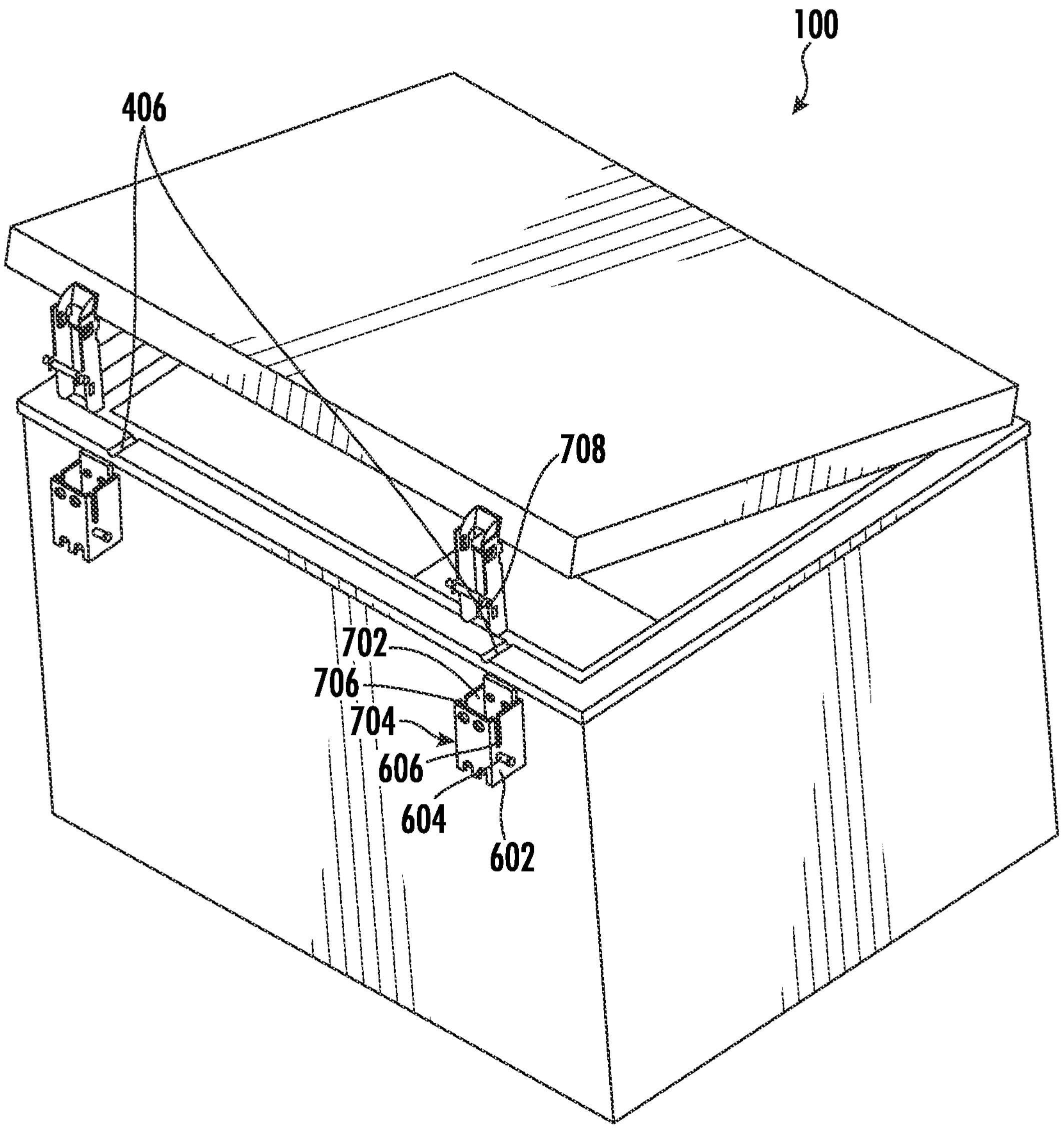
FIG. 7 illustrates a rear perspective view of the example freezer appliance of FIG. 1 with the hinges in a detached position.

FIG. 5 provides a side view of hinge system 200. First hinge arm 502 may pivotably adjoin to second hinge arm 504, which may be releasably received by carrier 506. As shown in FIG. 5, first hinge arm 502 may be coupled to door 120, and carrier 506 may be coupled to back portion 202. Carrier 506 may include front wall 508, rear wall 510, and bottom wall 512. Carrier 506 may also include first pin 514 and second pin 516. On the inside of front wall 508, the internal surface of carrier 506, wear pad 518 creates an interference fit for second hinge arm 504. Tether cable 404 may couple to second hinge arm 504 at one end, and couple to pin 402 at the opposite end. Tether cable 404 couples to pin 402 via eyelet 610, as seen in FIG. 6.

In FIG. 5 hinge system 200 is illustrated in an attached position where the second hinge arm 504 is received within the carrier 506. In particular, the second hinge arm 504 may be received within carrier 506 and held within carrier 506 by first pin 514 and second pin 516. When positioned as illustrated in FIG. 5, e.g., when hinge system 200 is in the attached position (e.g., second hinge arm 504 may be received within carrier 506), door 120 is shown in the open configuration providing access to interior chamber 304. When positioned as illustrated in FIG. 2, e.g., similar to FIG. 5, when hinge system 200 is in the attached position (e.g., second hinge arm 504 may be received within carrier 506), door 120 is shown in the closed position, sealingly enclosing interior chamber 304. As illustrated in FIG. 5, first pin 514 may be in an upper position, wherein first pin 514 wedges second hinge arm 504 forward along the transverse direction T, providing an interference fit between second hinge arm 504 and carrier 506, e.g., the between second hinge arm 504 and first pin 514 within carrier 506. With hinge system 200 in the attached position, e.g., when second hinge arm 504 may be received within carrier 506 and may be held in the carrier 506 by both first pin 514 and second pin 516, door 120 may rotate relative to the cabinet 302, e.g., between the closed position (FIG. 1) and the open position (FIG. 3). Also, when hinge system 200 may be in the attached position, second hinge arm 504 may be vertically supported by bottom wall 512 of carrier 506.

As may be seen in FIGS. 4 through 8, carrier 506 may include a front wall 508 fixed to the other of door 120 or the cabinet 302, e.g., fixed to back portion 202 of cabinet 302 as in the illustrated example embodiments. The carrier 506 may also include a rear wall 510 opposite the front wall 508, e.g., along the transverse direction T, with a first side wall 602 extending between front wall 508 and rear wall 510 and a second side wall 702 extending between front wall 508 and rear wall 510 opposite first side wall 602 along the lateral direction L. First pin 514 may extend through a first slot 604 formed in first side wall 602 and a second slot 704 formed in the second side wall 702, e.g., first pin 514 may extend generally along the lateral direction L. The second pin 516 may be spaced apart from, e.g., above, first pin 514 along the vertical direction V. The second pin 516 may extend through a third slot 606 formed in first side wall 602 and a fourth slot 706 formed in second side wall 702, e.g., second pin 516 may extend generally parallel to first pin 514 and/or along the lateral direction L. In some embodiments, only one of first pin 514 and second pin 516 may be provided. In other embodiments, both first pin 514 and second pin 516 may be included, as illustrated.

The first slot 604 and the second slot 704 may be mutually parallel to each other, and may be oblique to the vertical direction V. For example, the slots 604 and 704 may be oriented predominantly or generally within a vertical transverse plane defined by the vertical direction V and the transverse direction T and the slots 604 and 704 may be oblique to each of the vertical and transverse directions V and T. For example, first slot 604 and second slot 704 may be oriented at an angle of between about twenty degrees (20°) and about eighty degrees (80°) with respect to the vertical direction V, such as between about thirty degrees (30°) and about sixty degrees (60°), such as about forty-five degrees (45°) with respect to the vertical direction V. Third slot 606 and fourth slot 706 may be mutually parallel to each other and may be in line with the vertical direction V. Thus, as will be described in more detail below, first pin 514 may travel within the respective slots 604 and 704 between the upper position (e.g., as described above with reference to FIG. 5, where first pin 514 may be in the upper position) and a lower position by gravity (FIG. 6).

Figure 8:
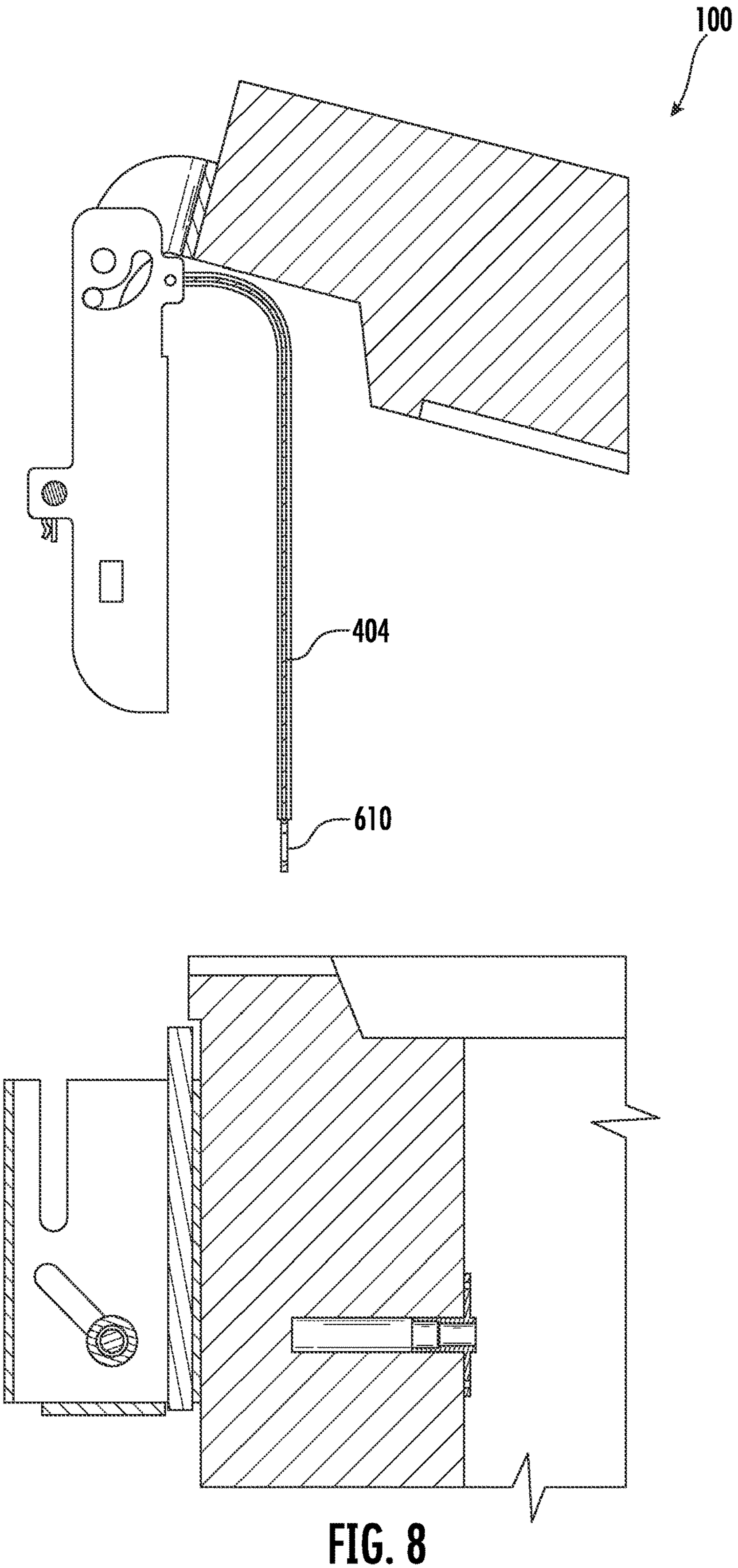
FIG. 8 illustrates a side section view of the hinge system of the example freezer appliance of FIG. 1 with the hinges in a detached position.

Turning specifically to FIGS. 5, 6, and 8, in some embodiments, hinge system 200 may provide a staged release. For example, hinge system 200 may be movable from the attached position (described above with respect to FIG. 5) to a first released position as shown in FIG. 6, and from the first released position of FIG. 6 to a released position as shown in FIG. 8. Application of a force to door 120 in an upward (along the vertical direction V) and/or outward (e.g., away from/out of the interior chamber 304) direction at a point near hinge system 200 may push the door 120 and hinge system 200 to a first released position where the second hinge arm 504 of hinge system 200 passes above first pin 514, causing first pin 514 to release the wedging interference fit between pin 514/carrier 506 and second hinge arm 504. First pin 514 may disengage from second hinge arm 504, when first pin 514 travels, e.g., slides and/or rolls, within first slot 604 and second slot 704 to the lower position at the bottom of the slots 604 and 704 under the force of gravity. In this position, e.g., the first released position, first pin 514 supports second hinge arm 504 along the vertical direction V. Accordingly, first pin 514 may also serve to retain hinge system 200 in the first released position by preventing second hinge arm 504 from falling back into place within carrier 506 until first pin 514 may be reset. For example, first pin 514 may be reset by a user lifting door 120 such that the second hinge arm 504 of hinge system 200 may not be resting on first pin 514 and then manually moving first pin 514 back to the upper position (FIG. 5) within the slots 604 and 704. Door 120 may be spaced apart from the opening 314 (FIG. 3), such as by a gap Gas illustrated in FIG. 6, when second hinge arm 504 may be supported on the first pin 514. Gap G creates airflow in to and out of cabinet 302. Tether cable 404 may be a desired length such that the first released position provides gap G and may not provide access to the interior chamber 304, thus keeping the contents secure. Moreover, the length of tether cable 404 may be selected to limit further upward movement of door 120 along the vertical direction V and thus limit or prevent unauthorized opening of door 120 at back portion 202 of appliance 100.

As may be seen above, pin 402 may couple tether cable 404 to the surface of rear wall 312. Pin 402 may be a detent pin, or similar, which slides through eyelet 610 and into an interference fit hole of rear wall 312. A detent pin may provide force to keep pin 402 in place during the transportation of appliance 100. Tether cable 404 is attached to eyelet 610, thus when pin 402 is inserted into rear wall 312 through eyelet 610 the contents of interior chamber 304 are secure. While the contents of interior chamber 304 are secure, door 120 may be spaced apart from opening 314 to provide gap G. To remove pin 402, a person within interior chamber 304 may pull pin 402 to remove it from rear wall 312 and from eyelet 610, thus freeing tether cable 404 from rear wall 312 and allowing removal of door 120 from cabinet 302 and exit from appliance 100.

Continued or additional application of upward/outward force on door 120 may move hinge system 200 from the first released position, e.g., as illustrated in FIG. 6, to the detached position, e.g., as illustrated in FIG. 8. As may be seen in FIG. 8, hinge system 200 may be separated subsequent to moving hinge system 200 to the first released position and detaching pin 402 which may couple tether cable 404 to the surface of rear wall 312. Door 120 may then be opened and rotated about the front lock 140, for example, acting as a hinge. For example, second hinge arm 504 may be entirely removed from carrier 506 such that hinge system 200 may be in a detached position after removing pin 402 from tether cable 404 eyelet 610, e.g., the door 120 may be rotated about front lock 140, completely off of cabinet 302 from the released position to the detached position illustrated in FIG. 8.

Also, as may be seen in FIG. 5, in some embodiments, the carrier 506 may include a wear pad 518 on the inside of front wall 508 of carrier 506. For example, the inside of front wall 508 faces the interior of carrier 506, such as the surface of the front wall 208 opposite the cabinet 302 and opposite an outer surface of the front wall 508 which abuts the cabinet 302.

As seen in FIGS. 5 and 6, first pin 514 may be restrained in carrier 506 by roller 520 to first and second slots 604 and 704. In at least some embodiments, one or more rollers, may be provided on first pin 514. For example, a roller 520 may be provided on first pin 514 within carrier 506. Roller 520 may include a first enlarged end on one side of first pin 514 (e.g., inside of and proximate first sidewall 602) and a second enlarged end on the other side of first pin 514 (e.g., inside of and proximate second sidewall 702). Roller 520 (including the enlarged ends thereof) may be formed of any suitable durable, low-friction material. For example, roller 520 may be formed of a plastic material, such as nylon or tetrafluoroethylene ("TEFLON"). Wear pad 518 may also be formed of the same material as roller 520 or a similar material. Roller 520 may be movable relative to first pin 514, e.g., roller 520 may be rotatable around first pin 514. Thus, roller 520 may promote ease of movement of hinge system 200 between the various positions described above, e.g., between the attached position, the released position and/or between the released position and the detached position.

Second pin 516 may be restrained by a clip 608 at one end of the second pin 516. In some embodiments, such as the illustrated example embodiment in FIG. 7, a collar 708 may be provided as well as clip removably attached to one end of second pin 516. In other embodiments, the collar 708 may, for example, be provided as a flange integrally formed with the second pin 516 instead of or in addition to the clip (e.g., in some embodiments, an integral flange may be provided at one end of second pin 516 and clip 608 may be provided at the other end of second pin 516).

As may be seen from the above, hinge system 200 may be moved into a first released position, as in FIG. 6. In other example embodiments, appliance 100 may activate one, some, or all, of the following responses upon being positioned to the first released position: turn on lights inside of cabinet 302, turn off the refrigeration system 102, turn on an audible alarm, send a notification to an external user interface via network interface 132, and turn on an audible instruction instructing how to remove pin 402 for moving hinge system 200 into the detached position. One skilled in the art would appreciate that the audible instruction may include more instruction than provided herein.

As may be seen from the above, with the increase in home grocery and package delivery, appliance 100 may provide a climate-controlled storage location for delivered items. Appliance 100 may be accessed by deliverers to drop off temperature sensitive goods. Appliance 100 may be positioned outside of a desired drop off location. Due to the exterior location of appliance 100, the requirement to prevent theft of the delivered goods, and the Refrigeration Safety Act of 1956, appliance 100 may have hinge system 200. Hinge system 200 may include a tethering system to the inside of the appliance 100 such that when a person within appliance 100 pushes on the inside of the lid, the hinge system will pop up and, without outside re-setting, not be able to drop back down and re-seal appliance 100. The tether cable 404 may have quick-release pin 402 that the child may pull from the body of the unit, thereby allowing escape from the appliance 100. The initial pop-up of hinge system 200 will be tied to the controller 130 such that the unit may turn on lights inside the device, turn off the compressor, turn on an audible alarm, send a push notification via network interface 132 to the device owner, create an air gap, and turn on audible alert instructing the child on how to remove pin 402.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance defining a vertical direction, a lateral direction, and a transverse direction, the vertical, lateral, and transverse directions being mutually perpendicular, the appliance comprising:
- a cabinet defining a food storage chamber, the food storage chamber comprising a top portion and a back portion, the top portion of the food storage chamber defining an opening for receipt of food items;
- a door positioned at the top portion of the food storage chamber and movable between a closed position and an open position to selectively enclose the food storage chamber in the closed position and provide access to the food storage chamber in the open position; and
- a hinge system rotatably coupling the door to the cabinet, the hinge system comprising,
  - a first hinge arm fixed to one of the door and the cabinet,
  - a second hinge arm pivotably joined with the first hinge arm,
  - a carrier fixed to the other of the door and the cabinet, the second hinge arm releasably received in the carrier, and
  - a tether cable extending between a first end and a second end, the first end of the tether cable fixed to the second hinge arm, the second end of the tether cable removably attached to a surface inside the food storage chamber,
  - wherein the tether cable configured such that the door may be detachable from the cabinet when the second end of the tether cable becomes detached from the surface inside the food storage chamber.

2. The appliance of claim 1, wherein the first hinge arm is fixed to the door and the carrier is fixed to the cabinet.

3. The appliance of claim 1, wherein the carrier comprises a front wall fixed to the other of the door or the cabinet, a rear wall opposite the front wall, a bottom wall, a first side wall extending between the front wall and the rear wall, a second side wall extending between the front wall and the rear wall opposite the first side wall along the lateral direction, a first slot formed in the first side wall and a second slot formed in the second side wall, wherein the second hinge arm is releasably held in the carrier by a first pin extending through the first slot and the second slot.

4. The appliance of claim 3, wherein the first slot and the second slot are mutually parallel, are oblique to the vertical direction, and oriented at an angle of about forty-five degrees with respect to the vertical direction.

5. The appliance of claim 3, further comprising a third slot formed in the first side wall, a fourth slot formed in the second side wall, wherein the second hinge arm is releasably held in the carrier by the first pin extending through the first slot and the second slot and a second pin extending through the third slot and the fourth slot.

6. The appliance of claim 5, wherein the first pin is movable within the first slot and the second slot from an upper position where the first pin provides an interference fit along the transverse direction between the second hinge arm and the carrier and a lower position where the first pin supports the second hinge arm along the vertical direction.

7. The appliance of claim 6, wherein the door encloses the food storage chamber when the door is in the closed position and the second hinge arm is received within the carrier while the pin is in the upper position and wherein the door is spaced apart from the opening of the food storage chamber when the second hinge arm is supported on the first pin along the vertical direction.

8. The appliance of claim 3, wherein the carrier further comprises a wear pad on an internal surface of the front wall opposite the cabinet and further comprising a roller on the first pin.

9. The appliance of claim 3, wherein the tether cable comprises an eyelet on at least one end of the tether cable, through which a second pin couples the tether cable to the surface of the food storage chamber, the second pin further comprising a T-shaped handle.

10. The appliance of claim 9, wherein the tether cable further comprises a length of cable to allow a gap for airflow while preventing access to the food storage chamber of the appliance.

11. The appliance of claim 1, comprising a channel in the back portion, proximate the hinge system, for allowing the tether cable to pass into the food storage chamber.

12. A hinge for an appliance, the appliance defining a vertical direction, a lateral direction, and a transverse direction, the vertical, lateral, and transverse directions being mutually perpendicular, the appliance comprising a cabinet and a door, the hinge rotatably coupling the door to the cabinet, the hinge comprising:
- a first hinge arm fixed to one of the door and the cabinet;
- a second hinge arm pivotably joined with the first hinge arm; and
- a carrier fixed to the other of the door and the cabinet, the second hinge arm releasably received in the carrier,
- a tether cable extending between a first end and a second end, the first end of the tether cable fixed to the second hinge arm, the second end of the tether cable removably attached to a surface inside the appliance,
- wherein the tether cable configured such that the door may be detachable from the cabinet when the second end of the tether cable becomes detached from the surface inside the appliance.

13. The hinge of claim 12, wherein the first hinge arm is fixed to the door and the carrier is fixed to the cabinet.

14. The hinge of claim 12, wherein the carrier comprises a front wall fixed to the other of the door or the cabinet, a rear wall opposite the front wall, a bottom wall, a first side wall extending between the front wall and the rear wall, a second side wall extending between the front wall and the rear wall opposite the first side wall along the lateral direction, a first slot formed in the first side wall and a second slot formed in the second side wall, wherein the second hinge arm is releasably held in the carrier by a first pin extending through the first slot and the second slot.

15. The hinge of claim 14, wherein the first slot and the second slot are mutually parallel, are oblique to the vertical direction, and are oriented at an angle of about forty-five degrees with respect to the vertical direction.

16. The hinge of claim 15, further comprising a third slot formed in the first side wall, a fourth slot formed in the second side wall, wherein the second hinge arm is releasably held in the carrier by the first pin extending through the first slot and the second slot and a second pin extending through the third slot and the fourth slot, the first pin further comprising a roller on the pin.

17. The hinge of claim 16, wherein the first pin is movable within the first slot and the second slot from an upper position where the first pin provides an interference fit along the transverse direction between the second hinge arm and the carrier and a lower position where the pin supports the second hinge arm along the vertical direction.

18. The hinge of claim 17, wherein the door encloses the cabinet when the second hinge arm is received within the carrier and the first pin is in the upper position and wherein the door is spaced apart from the cabinet when the second hinge arm is supported on the first pin along the vertical direction.

19. The hinge of claim 14, wherein the tether cable comprises an eyelet on at least one end of the tether cable, through which a second pin couples the tether cable to the surface of the cabinet, the second pin further comprising a T-shaped handle.

20. The hinge of claim 19, wherein the tether cable further comprises a length of cable to allow a gap for airflow while preventing access to the cabinet of the appliance.

* * * * *